United States Patent
Burch et al.

[11] Patent Number: 5,964,429
[45] Date of Patent: Oct. 12, 1999

[54] METHOD AND APPARATUS FOR WINDING AND FORMING FIELD WINDINGS FOR DYNAMO-ELECTRIC MACHINES

[75] Inventors: Jerry C. Burch, Northridge; Karolyn M. Czegledi, Agoura, both of Calif.

[73] Assignee: Labinal Components & Systems, Inc., Lombard, Ill.

[21] Appl. No.: 08/926,902

[22] Filed: Sep. 10, 1997

Related U.S. Application Data

[60] Provisional application No. 60/026,293, Sep. 10, 1996, and provisional application No. 60/044,931, Apr. 25, 1997.

[51] Int. Cl.$^6$ ............................................. H02K 15/085
[52] U.S. Cl. ................................. 242/432.2; 242/432.4; 29/596
[58] Field of Search ................... 242/432.2, 432.3, 242/432.4, 432.5, 432.6; 29/596

[56] References Cited

U.S. PATENT DOCUMENTS

| | | |
|---|---|---|
| 2,632,602 | 3/1953 | Weis . |
| 2,998,937 | 9/1961 | Potter et al. . |
| 3,081,043 | 3/1963 | Morrill ................................ 242/432.4 |
| 3,323,734 | 6/1967 | Peters . |
| 3,334,825 | 8/1967 | Friedrich . |
| 3,338,526 | 8/1967 | Shaff et al. . |
| 3,493,186 | 2/1970 | Arick . |
| 3,524,600 | 8/1970 | Peters . |
| 3,539,121 | 11/1970 | Peters . |
| 3,629,925 | 12/1971 | Brown, Jr. et al. . |
| 3,716,199 | 2/1973 | Ericson ................................ 242/432.4 |
| 3,753,282 | 8/1973 | Wiehl . |
| 3,822,830 | 7/1974 | Peters . |
| 3,841,133 | 10/1974 | Rice, Jr. . |
| 3,856,221 | 12/1974 | Arick et al. . |
| 3,857,221 | 12/1974 | Arick et al. . |
| 3,903,593 | 9/1975 | Mason ....................................... 29/596 |
| 3,903,933 | 9/1975 | Arick et al. ............................. 140/92.1 |
| 3,913,373 | 10/1975 | Kindig ....................................... 72/355 |
| 3,985,163 | 10/1976 | Vogel et al. ............................ 140/92.1 |
| 3,985,164 | 10/1976 | Grawcock ............................... 140/92.1 |
| 3,995,785 | 12/1976 | Arick et al. . |
| 4,033,385 | 7/1977 | Taube ...................................... 140/92.1 |
| 4,051,595 | 10/1977 | Bale ........................................... 29/596 |
| 4,053,111 | 10/1977 | Eminger ............................... 242/432.5 |
| 4,106,189 | 8/1978 | Peters ........................................ 29/736 |
| 4,290,190 | 9/1981 | Arnold ...................................... 29/596 |
| 4,498,636 | 2/1985 | Boesewetter et al. . |
| 4,588,143 | 5/1986 | Hetzel . |
| 4,724,604 | 2/1988 | Kawazoe et al. ......................... 29/606 |
| 4,880,173 | 11/1989 | Lachey . |
| 5,056,212 | 10/1991 | Scherer ................................... 29/564.5 |
| 5,113,573 | 5/1992 | Taji et al. ................................ 29/596 |
| 5,134,769 | 8/1992 | Scherer .................................... 29/596 |
| 5,186,405 | 2/1993 | Beakes et al. . |
| 5,235,738 | 8/1993 | Eminger ................................... 29/736 |
| 5,273,223 | 12/1993 | Tsugawa ............................. 242/432.4 |
| 5,316,227 | 5/1994 | Oohashi et al. ....................... 242/7.03 |
| 5,383,618 | 1/1995 | Santandrea et al. . |
| 5,528,822 | 6/1996 | Ponzio et al. . |
| 5,549,253 | 8/1996 | Beakes et al. ........................ 242/432.3 |
| 5,664,317 | 9/1997 | Ponzio et al. ........................ 242/432 X |
| 5,732,900 | 3/1998 | Burch .................................. 242/432.5 |

FOREIGN PATENT DOCUMENTS

| | | | |
|---|---|---|---|
| 360016160 | 1/1985 | Japan ................................. 242/432.3 |
| 2115447 | 9/1983 | United Kingdom ................ 242/432.3 |

*Primary Examiner*—Donald P. Walsh
*Assistant Examiner*—Emmanuel M. Marcelo
*Attorney, Agent, or Firm*—Biebel & French

[57] ABSTRACT

A method of winding stators having skewed slots and an apparatus for performing the method. The method includes the steps of positioning a stator in a stator winding machine wherein the winding machine includes a winding spindle having a wire exit aperture. Wire is fed through the wire exit radially outwardly for placement on the stator while the winding spindle is simultaneously moved in rotating and reciprocating movement to direct wire into the slots and around the ends of the teeth of the stator. The wire is fed at a predetermined rate from a feed mechanism located upstream from and mounted for movement with the winding spindle. The rate at which the wire is fed may be varied depending on the position of the winding spindle in a winding cycle and the desired position for placement of the wire within the stator.

12 Claims, 8 Drawing Sheets

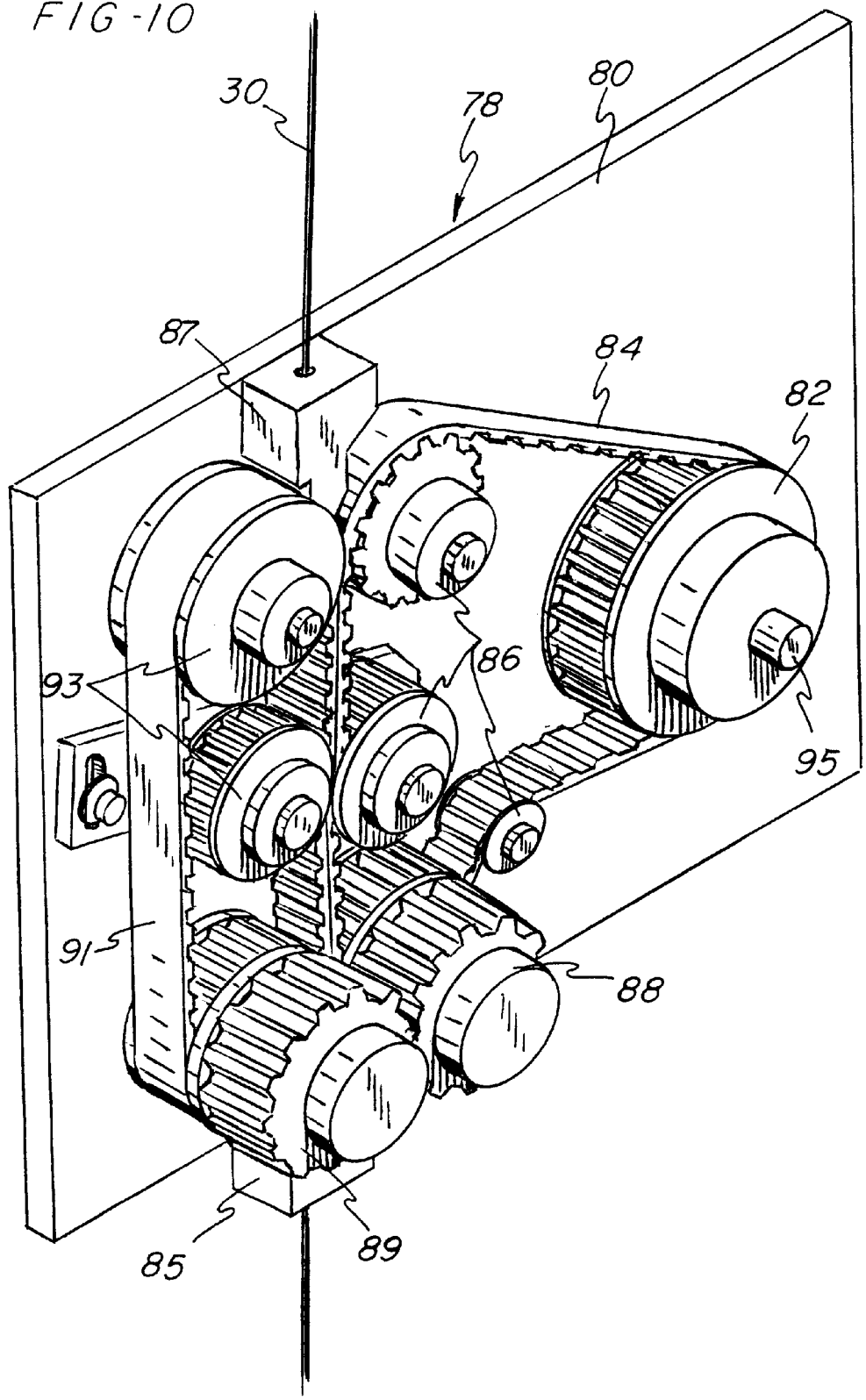

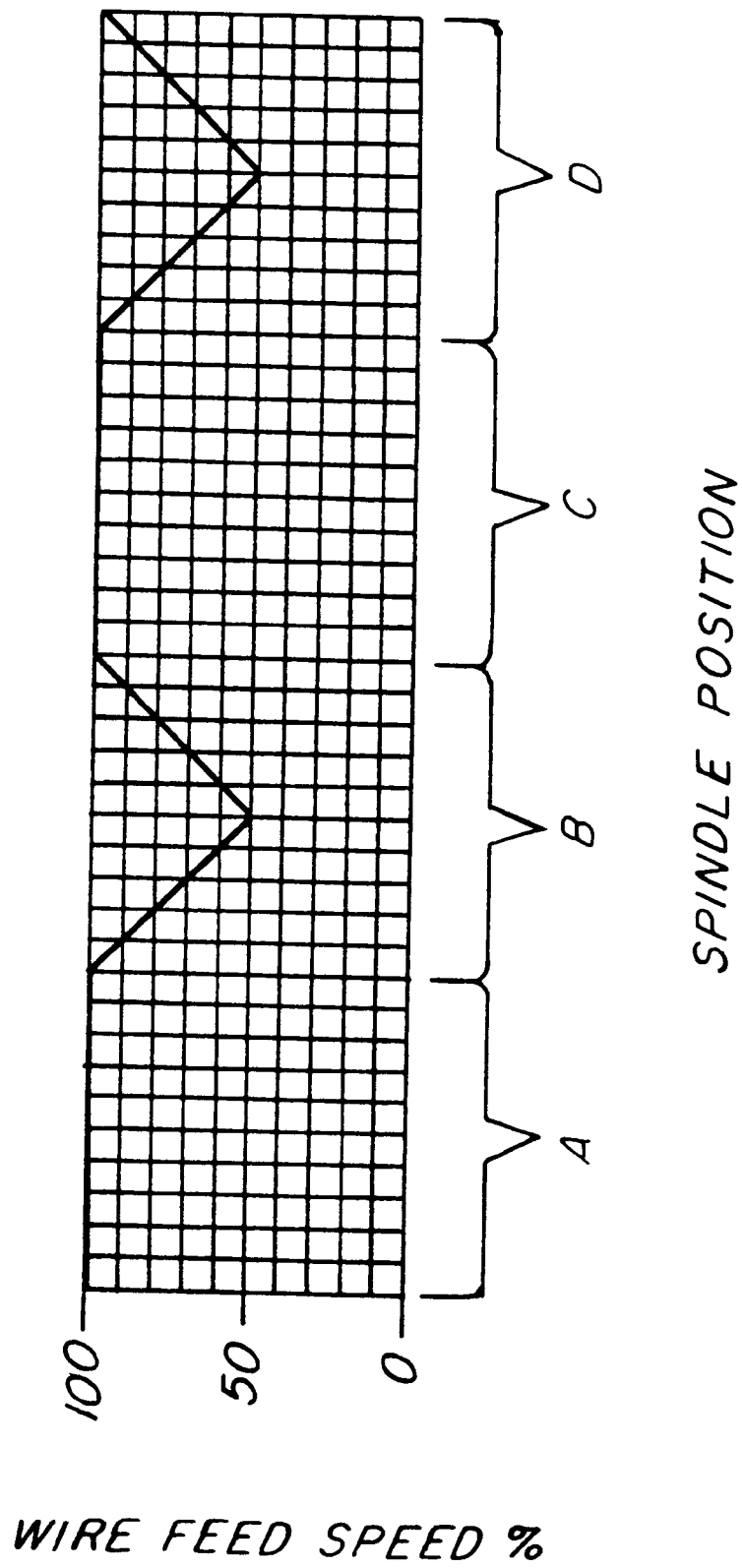

METHOD AND APPARATUS FOR WINDING AND FORMING FIELD WINDINGS FOR DYNAMO-ELECTRIC MACHINES

RELATED APPLICATION

This application claims the benefit of prior U.S. provisional applications Ser. No. 60/026,293, filed Sep. 10, 1996 and 60/044,931, filed on Apr. 25, 1997.

BACKGROUND OF THE INVENTION

1. Field of the Invention

The present invention relates to the formation of field windings for dynamo-electric machines and, more particularly, relates to the efficient formation of layered windings in stators having skewed slots.

2. Description of Related Prior Art

Many conventional dynamo-electric machines include a stator core formed by a plurality of stacked thin laminations of magnetically permeable material defining a central bore for receiving a rotor member of the machine. The stator core typically includes a plurality of slots extending radially from the central bore and defined by radially extending teeth. Field coils of the machine are positioned on the teeth of the stator core and are formed by insulated wire conductor wound around each of the teeth, or around predetermined groups of teeth, a predetermined number of turns.

The field coils are generally applied to the stator by either preforming the coils and pushing them through the slots onto the stator teeth, or by winding the wire directly onto the stator teeth, which may be accomplished by a winding machine. Winding machines for winding wire onto stators have been used for many years and generally include a winding head mounted on the end of a shuttle and positioned in axial alignment with the bore of a stator. The shuttle is sequentially reciprocated and oscillated in a cyclic manner to move the winding head through the bore of the stator in order to position the wire for the coils in the slots of the stator. The wire is drawn or pulled from the winding head in response to its movement relative to the stator, and the winding head is typically provided with a radially extending needle which is adapted to properly radially position the wire within the slots and around the ends of the teeth of the stator.

Existing winding machines have generally controlled the movement of the winding head by using a combination of cams and gears to effect the desired reciprocating and oscillating movement. Further, such machines are for the most part designed to perform a winding operation on only stators having straight slots, as opposed to skewed slot stators. Typical prior art winding machines are illustrated in U.S. Pat. Nos. 3,338,526, 3,493,186 and 3,524,600.

In an improvement on stator winding machines for winding stators having straight slots, U.S. Pat. No. 3,539,121 discloses a machine for winding stators with skewed slots. This machine is provided with a skewed cam for guiding a roller connected to the shuttle wherein the skewed cam is shaped in accordance with the slots of the stator to be wound. Accordingly, although this machine discloses a mechanism for winding skewed stators, a specially shaped cam must be provided for each particular stator configuration to enable the spindle to follow the shape of the stator slots. Also, an additional mechanism is required to oscillate the shuttle as it reaches the ends of the slots such that the movements of the shuttle are provided through a relatively complex combination of mechanisms.

A problem associated with conventional winding machines, and in particular when forming coils for stators having skewed slots, is the positioning of the wire within the slot in such a manner that a minimum of wire is used to form the desired number of coil turns. As a result of drawing the wire from the winding head in tension as it is wound around the stator teeth, the positioning of the wire has in the past been relatively imprecise such that obtaining of uniform wire layers has heretofore been extremely difficult if not impossible with existing winding techniques and machinery. Further, the existing techniques for winding stators having skewed slots do not permit for placement of the winding wire in a predetermined layered pattern to maximize the efficient use of the winding wire and thereby decrease the overall cost of the wound stator.

SUMMARY OF THE INVENTION

The present invention provides a method and apparatus for providing stators having skewed slots with field windings. The apparatus is adapted to wind the field windings directly onto the stator, and guide the wire through the stator slot in such a manner that uniform wire layers may be formed through the winding process.

The method of forming field coils in accordance with the present invention is performed by a winding machine having a winding spindle supported for rotating and reciprocating movement to direct wire into skewed slots on a stator wherein the slots are defined by radially extending teeth oriented at a predetermined skew angle. The winding spindle is driven in reciprocating movement by a first servo motor, and is driven in rotating or oscillating movement by a second servo motor.

The winding spindle is supported for reciprocating movement on a slide block which is guided in vertical movement by a guide rod structure along a predetermined vertical path. The slide block is connected to the first servo motor through an eccentric drive rod which is driven in reciprocating movement by a main eccentric mounted for rotation on a shaft driven by the first servo motor.

The winding spindle is connected to the second servo motor for actuation in rotating movement by a belt drive mechanism. The belt drive mechanism includes a toothed belt engaged around a gear concentric with and rigidly attached to the winding spindle, and driven at an opposite end by a gear having a central portion slidably engaged along a splined shaft wherein the splined shaft is driven in rotation by the second servo motor.

Wire for winding onto the stator is driven or pushed from a wire exit, defined in a radial face of the winding spindle, radially outwardly to desired predetermined locations on the stator. The wire is driven through the winding spindle by a linear feed mechanism mounted for reciprocating movement on the slide block. The feed mechanism is driven by a toothed belt extending to a splined shaft rotatably driven by a third servo motor. The belt for the feed mechanism travels vertically along the splined shaft in response to the reciprocating vertical movement of the slide block.

The rate at which the wire is fed from the winding spindle is controlled through a programmable controller for controlling the winding operation. Accordingly, the wire feed rate can be varied depending on the particular location of the wire exit relative to the stator during a winding cycle. In this manner, the wire may be laid in a controlled manner at desired radial positions within the stator slot throughout the movement of the winding spindle.

Therefore, it is an object of the present invention to provide a method of winding stators having skewed slots.

It is a further object of the invention to provide a method and apparatus whereby wire may be fed into stator slots in a controlled manner.

It is yet another object of the invention to provide a method and apparatus for producing a stator having skewed slots wherein the wire forming field coils for the stator is wound in substantially uniform layers in the slots.

Other objects and advantages of the invention will be apparent from the following description, the accompanying drawings and the appended claims.

BRIEF DESCRIPTION OF THE DRAWINGS

FIG. 10 is a perspective view of the wire feed mechanism; and

FIG. 11 is a graph illustrating the wire feed speed versus the position of the spindle.

DETAILED DESCRIPTION OF THE PREFERRED EMBODIMENT

Figure 1:
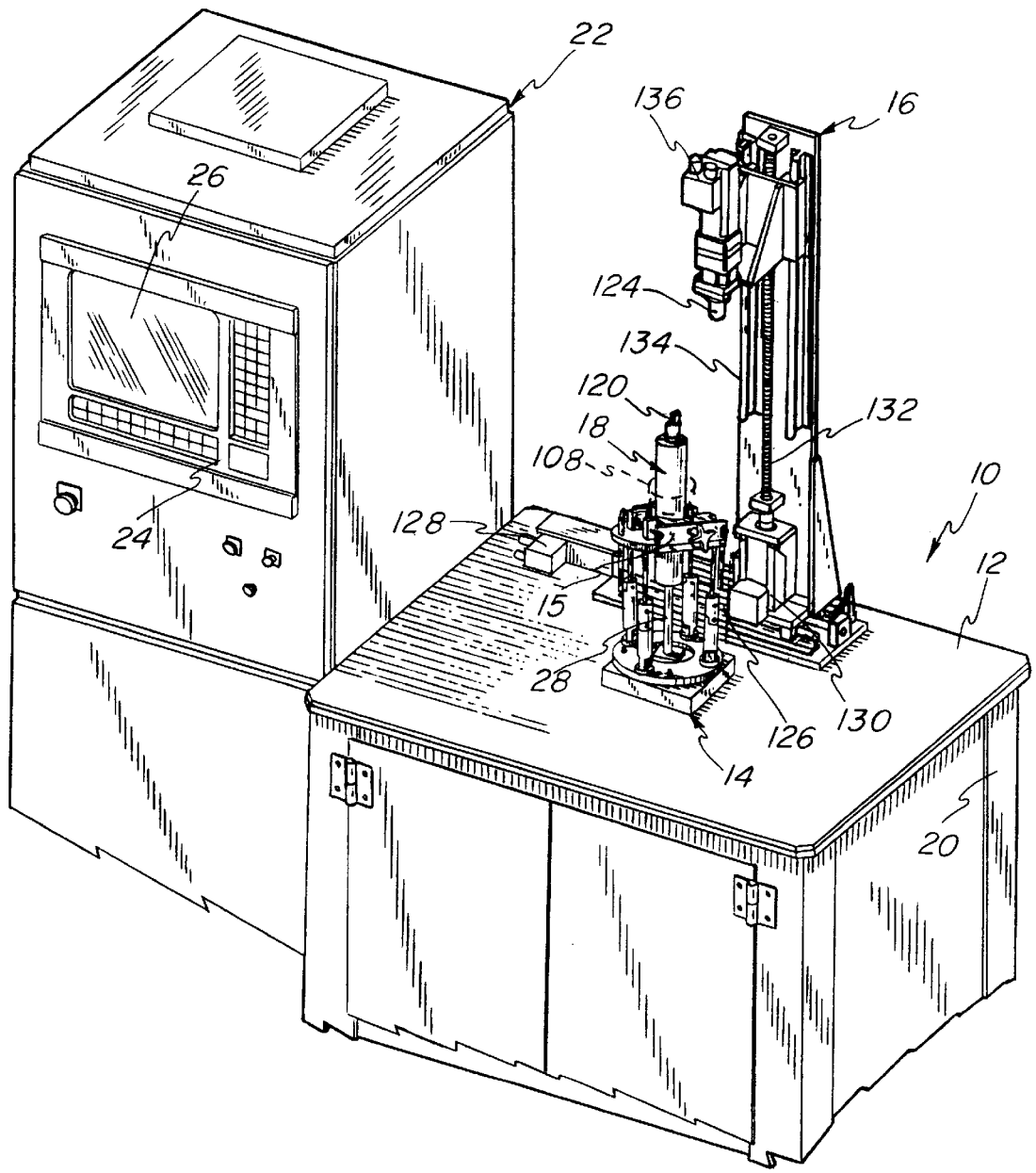
FIG. 1 is a perspective view showing a winding machine for performing the method of the present invention.

Referring to FIG. 1, a winding machine 10 for performing the method of the present invention is illustrated. The winding machine 10 includes a table top 12 supporting a stator nest 14 and a forming tower 16. The stator nest 14 includes a clamp 15 for supporting a stator 108 (illustrated in phantom lines).

A winding spindle 18 extends upwardly through the stator support nest 14. The winding spindle 18 is driven in reciprocating and oscillating or rotating movement by a drive mechanism located below the table 12 in a cabinet 20. In addition, a programmable controller 22 is provided for selecting and controlling the winding operation. The programmable controller 22 includes an input panel 24 for inputting parameters for a winding operation, as well as for modifying winding operations. A monitor 26 is also provided for displaying information relating to the winding operation, such as the selected parameters for the winding operation, error messages and similar information for facilitating operator control of the winding process.

Figure 2:
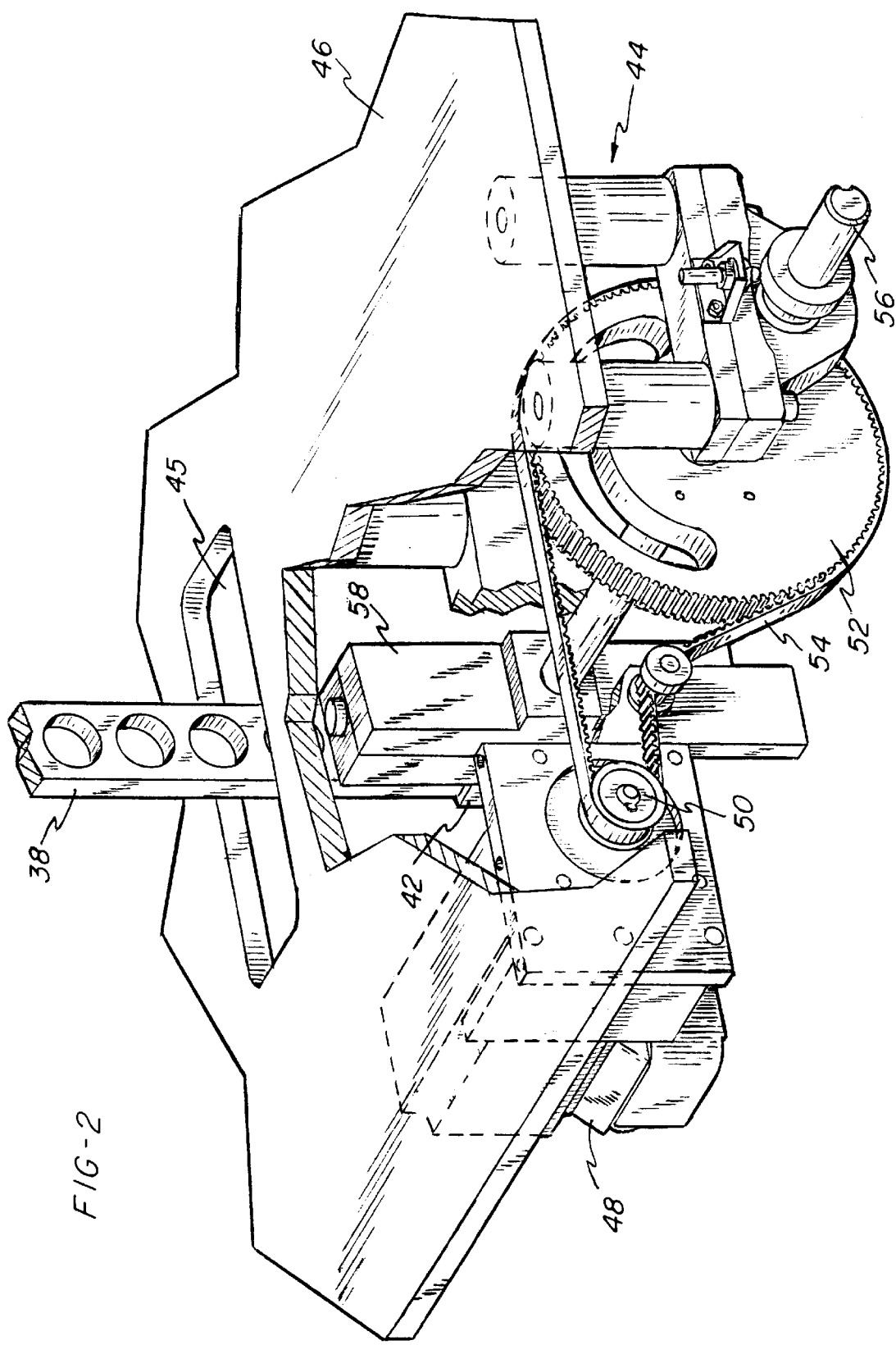
FIG. 2 is a partial perspective view showing the drive mechanism for moving the winding spindle of the winding machine in reciprocating movement.
Figure 3:
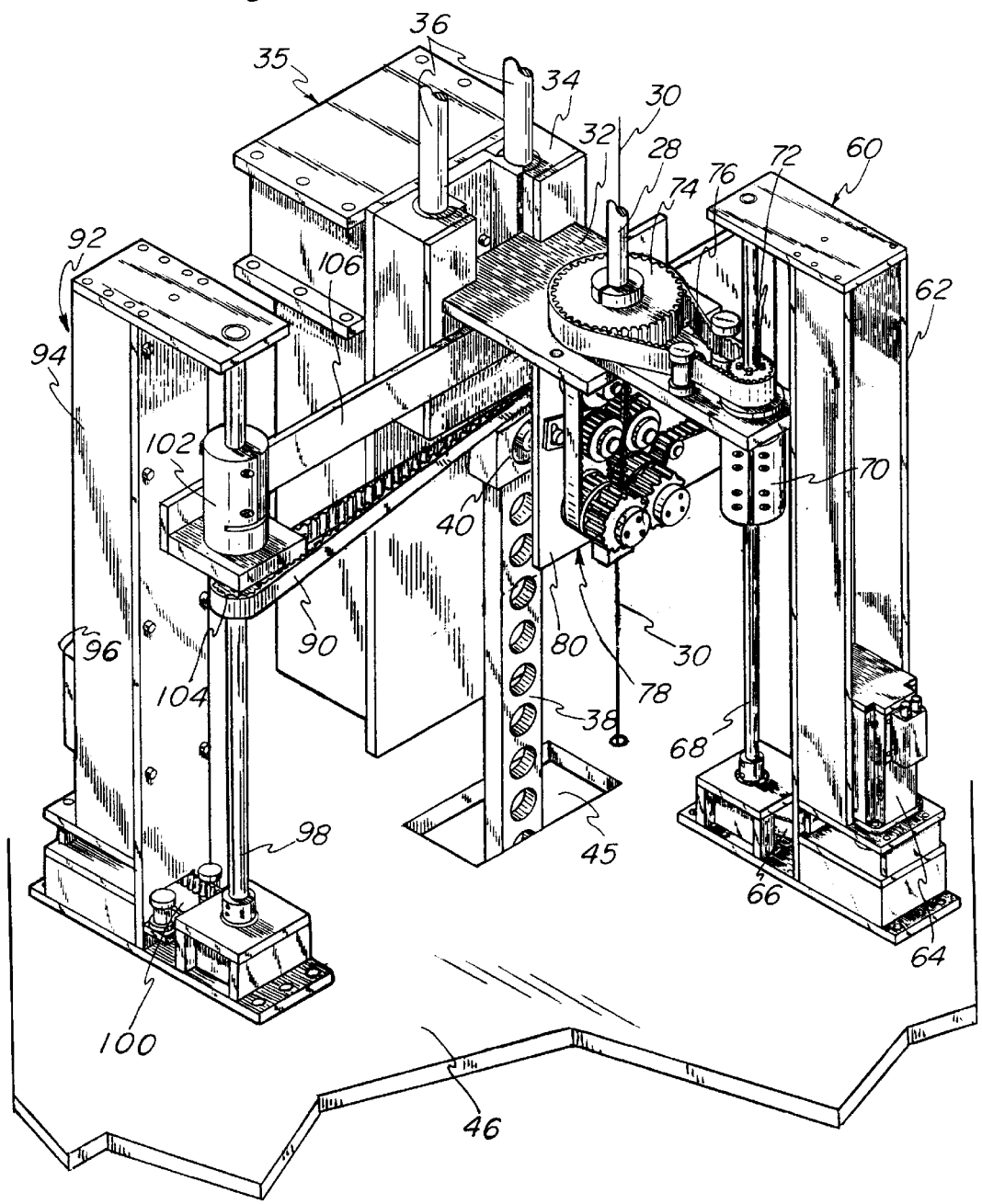
FIG. 3 is a partial perspective view showing further drive mechanisms for the winding spindle and for feeding the winding wire.

Referring further to FIGS. 2 and 3, the winding spindle 18 is supported on a spindle shaft 28 wherein the spindle shaft 28 is formed as a hollow tubular member for guiding an insulated wire 30 upwardly into a longitudinal passage extending through the winding spindle 18 for winding onto a stator. The spindle shaft 28 is supported on a slide block platform 32 which is attached to a slide block 34. The slide block 34 is supported for sliding movement on parallel rails 36 of a guide rod structure 35 wherein the slide block 34 is actuated for reciprocating vertical movement by an eccentric drive rod 38.

An upper end of the eccentric drive rod 38 is attached for pivotal movement to the slide block 34 at a pivot connection 40, and a lower end 42 of the drive rod 38 extends through an opening 45 in a floor 46 located within the cabinet 20 and is connected to an eccentric drive mechanism 44. The eccentric drive mechanism 44 is supported on the under side of the floor 46 and includes a first or longitudinal servo motor 48 controlled by the programmable controller 22. The first servo motor 48 drives a drive gear 50 which rotatably drives a follower gear 52 through a toothed drive belt 54. The follower gear 52 is mounted on a shaft 56 to drive the shaft 56 in rotating movement in response to drive inputs from the first servo motor 48.

A main eccentric 58 is rigidly mounted to the shaft 56 and is connected to the lower end 42 of the eccentric drive rod 38. The lower end 42 of the drive rod 38 is connected to the main eccentric 58 through a rotatable connection, and the rotatable connection is positioned at a preselected distance from the central axis of the shaft 56 whereby rotation of the main eccentric 58 causes the drive rod 38 to move vertically in reciprocating movement. Further, the attachment point between the drive rod 38 and the main eccentric 58 is adjustable wherein the lower end 42 of the drive rod 38 may be positioned at different distances from the central axis of the shaft 56 to thereby provide different stroke lengths for the reciprocating movement of the drive rod 38.

As seen in FIG. 3, the spindle shaft 28 is driven in rotating or oscillating movement by an oscillator servo tower 60 mounted on the floor 46. The oscillator servo tower 60 includes a tower frame 62 supporting a second or rotational servo motor 64 which drives a toothed belt 66 for rotating a splined shaft 68. The second servo motor 64 operates under control of the programmable controller 22 to precisely control the rotation of the shaft 68 to desired angular positions.

A coupler 70 is slidably mounted for vertical movement along the splined shaft 68 and includes spline engaging means for cooperating with the splines on the shaft 68 such that the coupler 70 rotates with the shaft 68. The coupler 70 is rotatably mounted to the bottom of the slide block platform 32 and is coupled to an oscillator gear 72 wherein the oscillator gear 72 and coupler 70 rotate together in response to rotation of the shaft 68.

The spindle shaft 28 is supported for rotation on the spindle block platform 32 by a spindle shaft gear 74 which is coupled to the oscillator gear 72 by a toothed belt 76. Thus, the second servo motor 64 is coupled to the spindle shaft 28 to thereby cause the spindle shaft 28 to rotate in a controlled manner to precisely control the angular orientation of the winding spindle 18 relative to a stator during a winding operation. Further, it can be seen that by providing a sliding coupling between the splined shaft 68 and the oscillator gear 72, the vertical movement of the slide block platform 32 is accommodated while permitting controlled angular movement of the spindle shaft 28.

As seen in FIGS. 3 and 10, the wire 30 is fed upwardly into the winding spindle 18 by a wire feed mechanism 78. The wire feed mechanism 78 includes a plate 80 rigidly mounted to and extending downwardly from the slide block platform 32. The plate 80 supports a toothed belt drive wheel 82 for driving a first wire feed belt 84. The first wire feed belt 84 extends around a plurality of guide wheels 86 and around a first toothed transmission wheel 88 which includes outer teeth engaging outer teeth on a second toothed transmission wheel 89 whereby the second transmission wheel 89 is driven in rotation by the first transmission wheel 88. The second transmission wheel 89 drives a second wire feed belt 91 around guide wheels 93 wherein the first and second wire feed belts 84, 91 are biased into engagement with each other and define a wire feed nip therebetween whereby the wire 30 is caused to move through the feed mechanism 78 and upwardly through the spindle shaft 28 at a linear speed equal to that of the belts 84, 91. Further, the wire 30 is guided into and out of the feed mechanism 78 by guide blocks 85, 87 located closely adjacent to the belts 84, 91 at entry and exit points for the wire 30.

The drive wheel 82 is driven in rotation by a shaft 95 which mounts the drive wheel 82 and which further supports a wheel (not shown) on a back side of the plate 80 which is driven in rotation by a toothed belt 90 to rotatably drive the shaft 95 and drive wheel 82. The toothed belt 90 is driven by a wire feed servo tower 92 which is similar in construction to the oscillator servo tower 60. The wire feed servo tower 92 includes a tower frame 94 supporting a third or wire feed servo motor 96 for driving a splined shaft 98 through a toothed belt 100 wherein the third servo motor 96 operates under control of the programmable controller 22. The splined shaft 98 is slidably engaged with a coupler 102 wherein the coupler 102 rotates with the splined shaft 98 and causes a gear wheel 104 to rotate and thereby drive the toothed belt 90.

The coupler 102 and gear 104 are supported on an arm 106 rigidly attached to the slide block 34 for vertical movement with the slide block 34. Thus, the wire feed tower 92 is adapted to precisely control the rate at which the wire is fed through the spindle shaft 28 regardless of the vertical position of the winding spindle 18 in its reciprocating movement.

It should be noted that the linear feed mechanism 78 feeds the wire without causing undue bending of the wire to thereby avoid deformation of the wire 30 prior to it being placed onto a stator during a winding operation. Further, by mounting the wire feed mechanism 78 for movement with the spindle shaft 28 and winding spindle 18, the feed rate of the wire 30 relative to the winding spindle 18 is precisely controlled regardless of the rate of vertical movement or position of the winding spindle 18 in its winding cycle.

Figure 4:
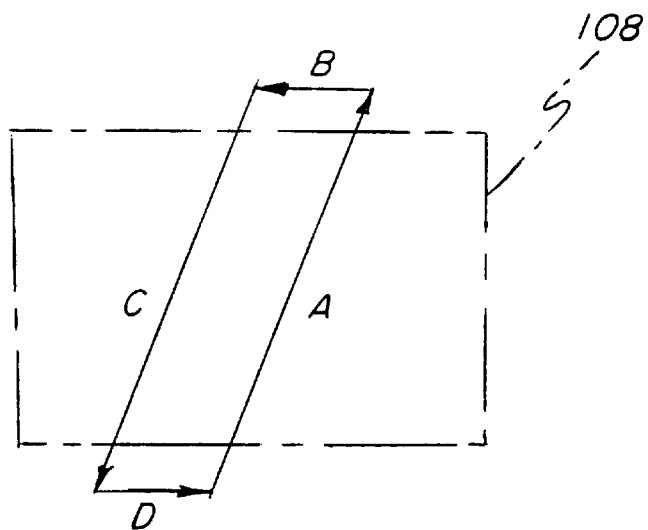
FIG. 4 is a diagrammatic view illustrating the movement of the winding spindle during winding of a stator having skewed slots.

Referring to FIG. 4, a typical winding cycle is illustrated for winding a single tooth on a stator 108 having skewed slots. The paths labeled A and C illustrate the reciprocating movement of the spindle as it inserts wire radially outwardly from the spindle 18 through the slots of the stator. It may be noted that during the reciprocating movement driven by the first servo motor 48, the second servo motor 64 simultaneously drives the spindle 18 in rotational movement whereby a wire exit, defined by a radial passage extending from the longitudinal passage in the spindle 18, follows a path corresponding to the angle of the slot in the stator 108.

The paths labeled B and D illustrate the path followed by a wire exit on the spindle 18 to position wire along the ends of the stator tooth wherein the oscillating movement of the spindle 18 along the paths B and D is controlled by the second servo motor 64. It should be noted that the rate at which the wire is fed from the spindle 18 through the slots in the stator 108 along the paths A and C may be different than the rate at which it is fed onto the ends of the teeth 114 of the stator 108 along paths B and D, and further may be varied to compensate for accelerations and decelerations of the winding spindle 18 at the transitions between A–B, B–C, C–D and D–A.

Referring to FIG. 11, an example of the wire speed versus the position of the spindle 18 along the paths A, B, C, D. of FIG. 4 is illustrated. As can be seen, the wire 30 is fed at a maximum, substantially constant speed as it is fed through the slots in the stator 108. As the spindle 18 feeds wire around the ends of the teeth of the stator, the wire speed linearly decreases until the wire exit on the spindle 18 is midway between slots and then increases as it approaches a slot.

Figure 5:
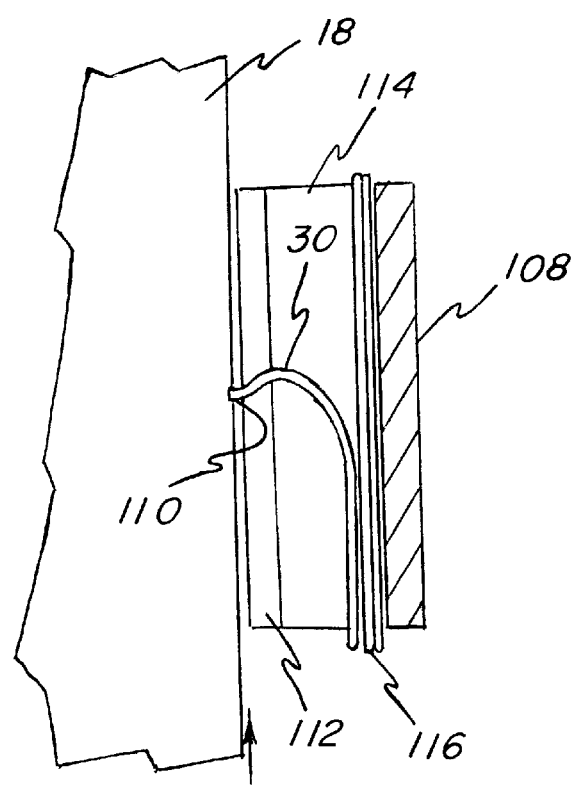
FIG. 5 is a partial cut-away side elevational view showing wire being fed through a stator slot.
Figure 6:
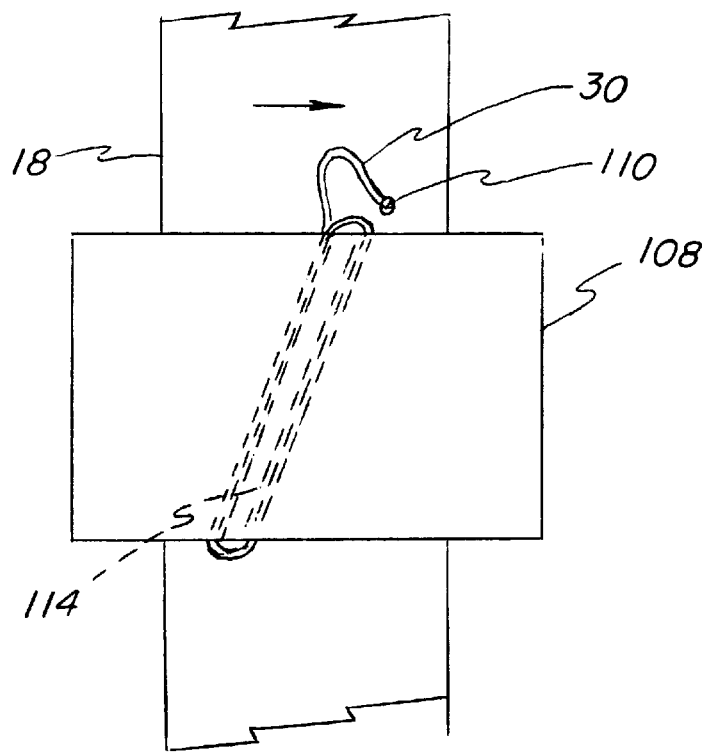
FIG. 6 is a side elevational view showing winding wire being fed over the end of a stator slot.
Figure 7:
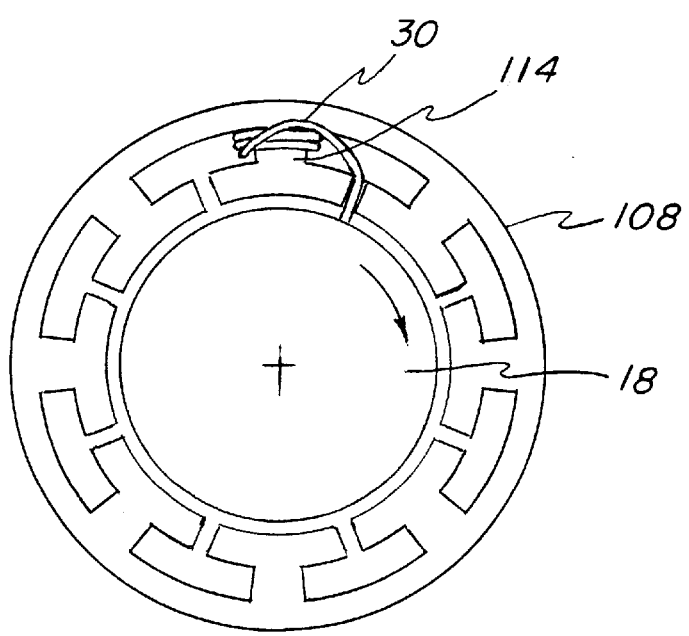
FIG. 7 is a top plan view showing winding wire being fed over the end of a stator slot.

Referring to FIGS. 5–7, the layering of a wire 30 is illustrated as the spindle 18 feeds the wire 30 from a wire exit 110 through a slot 112 and around the end of a stator tooth 114. As can be seen in these figures, a loop of wire will typically be formed as it passes from the wire exit 110 in order to direct the wire radially outwardly and cause it to be positioned at a desired radial position to form a uniform layer of windings 116. By feeding the wire outwardly and causing it to lie at desired predetermined positions in uniform layers, for example at positions located successively radially inwardly, the amount of wire required for forming a winding is reduced and a more uniform field coil is formed.

It should be noted that at the conclusion of winding a tooth of the stator to form a coil, the spindle shaft 28 may be rotated to a desired position adjacent to another tooth or set of teeth where the next coil is to be wound. The programmable controller 22 may be programmed to control the second servo motor 64 for the oscillator tower 60 to position the winding spindle 18 at any particular rotational position desired throughout the winding operation. Further, it should be noted that the controller 22 can be programmed to wind any particular configuration for the stator, such that stators having slots arranged at different skew angles may be wound. The necessary changes for altering the winding operation may be easily entered by an operator at the input panel 24, thus eliminating time consuming mechanical adjustments to the machine when an alteration to the winding operation is required.

Figure 8:
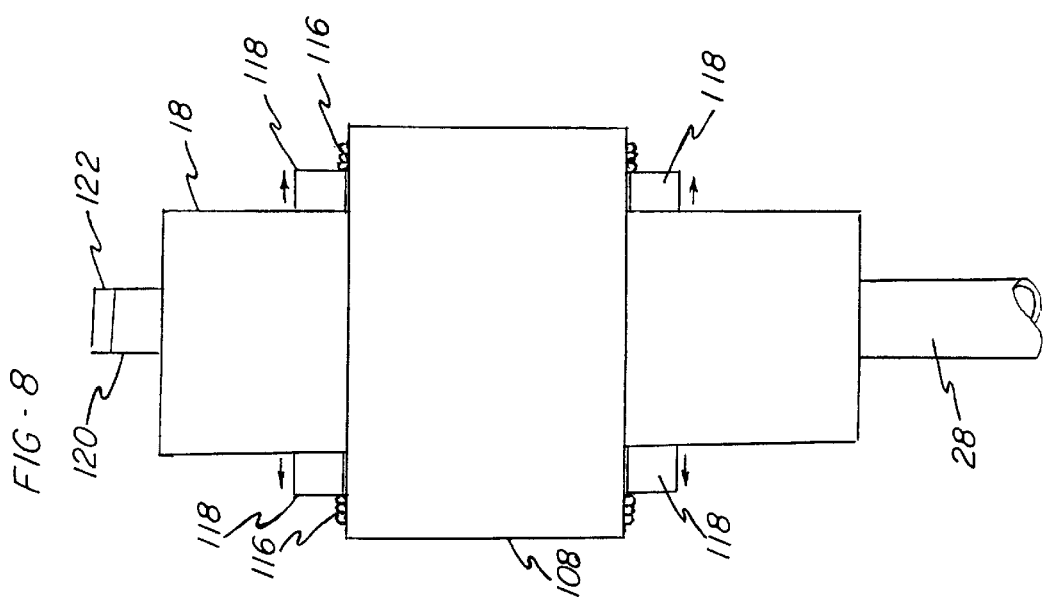
FIG. 8 is a side elevational view illustrating operation of forming racks on the winding spindle to form wound wires during a winding operation.

During the winding operation, a forming operation is performed on the coils at intervals after predetermined numbers of winds of wire are placed on the stator in order to ensure that a compact and properly formed coil is produced. As illustrated in FIG. 8, the spindle 18 is provided with forming racks 118 which move radially outwardly from the spindle 18 to form the coils 116. The racks 118 are actuated for movement by rotation of a top cap 120.

Referring further to FIG. 1, the top cap 120 includes an upper key 122 for engagement by a cap rotator 124 which is supported on the forming tower 16. The forming tower 16 includes a rail-like screw driven horizontal positioner 126 actuated by a servo motor 128 controlled by the programmable controller 22. In addition, vertical positioning of the cap rotator 124 is provided by a further servo motor 130, also controlled by the programmable controller 22, which drives a screw member 132 for positioning the cap rotator 124 along a vertical rail structure 134. The cap rotator 124 is actuated in rotating movement by a servo motor 136 which is mounted for movement with the cap actuator 124.

During a forming operation, the programmable controller 22 causes the forming tower 16 to move horizontally and vertically for engaging the cap rotator 124 with the top cap 120. Upon engagement between the cap rotator 124 and top cap 120, the servo motor 136 is actuated to rotate the top cap and thereby actuate the forming racks 118 outwardly. The operation of the forming racks 118 is similar to that described in co-pending U.S. application Ser. No. 08/550, 177 filed Oct. 30, 1995 and U.S. application Ser. No. 08/821,647 filed Mar. 20, 1997, both applications commonly owned with the present application and incorporated herein by reference.

It should be noted that although only one wire is referenced in the description of the winding operation of the present invention, a plurality of wires may be provided for winding simultaneously on the stator 108. For example, FIG. 8 shows a pair of coils wound simultaneously on opposite sides of the stator 108. In the event where a plurality of wires are fed for simultaneous winding from the winding spindle 18, the wires will be simultaneously fed by the belts 84, 91 of the feed mechanism 78 and may be guided through the winding spindle in the manner disclosed in the above noted U.S. application Ser. No. 08/821,647 incorporated herein by reference.

Figure 9:
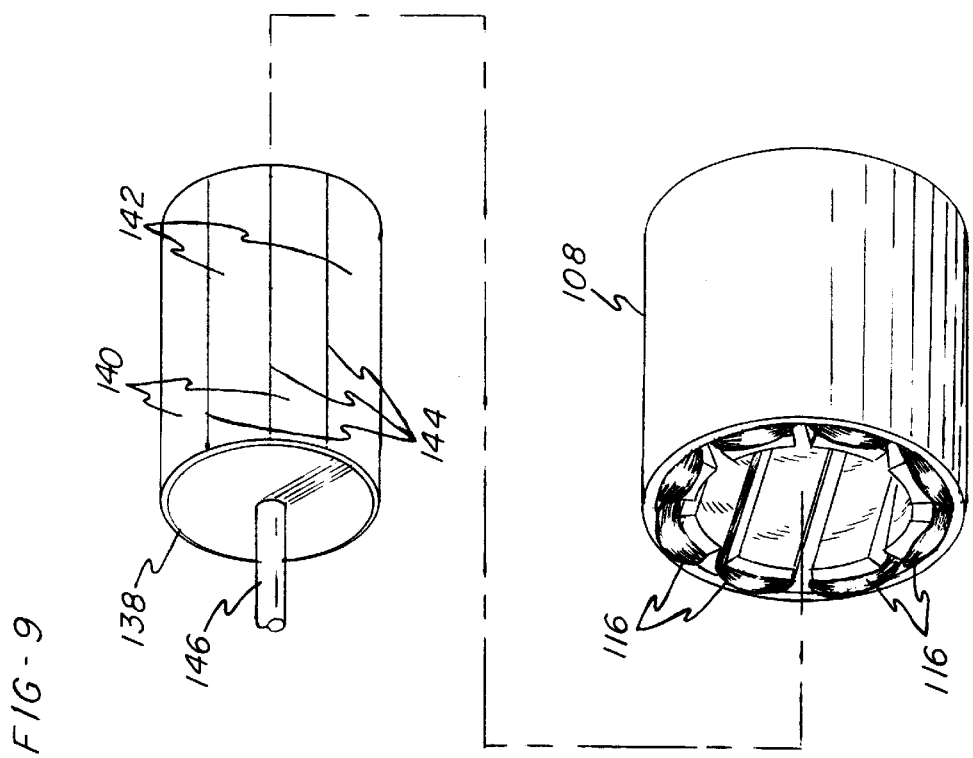
FIG. 9 is an exploded perspective view illustrating a rotor and stator assembly.

FIG. 9 illustrates a stator 108 having skewed slots provided with field coil windings 116 wound in accordance with the present invention in combination with a rotor 138 for forming a motor. In a preferred embodiment, the rotor 138 is formed of a ferrite material and includes alternating north poles 140 and south poles 142 wherein the interfaces 144 between the poles 140, 142 are aligned parallel to a central shaft 146 of the rotor 138. It should be noted that providing one of the stator 108 or rotor 138 with a skewed pole configuration facilitates the elimination of ripple effects in the motor. Further, forming the magnetic material of the rotor 138 with poles 140, 142 and interfaces 144 skewed relative to the axis of the shaft 146 is problematic and increases the complexity of the motor. Accordingly, the skewed stator configuration of the present invention simplifies the construction of the motor and significantly reduces the cost of the motor as a result of simplifying the construction and reducing the amount of winding wire required through efficient winding of the field coils on the stator.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A method of forming field coils on a stator for a dynamo-electric machine, said stator including a plurality of skewed slots defined by stator teeth oriented at a predetermined skew angle relative to a longitudinal axis of the stator, said method comprising:

positioning said stator in a stator winding machine, said winding machine including a winding spindle having a wire exit aperture;

feeding wire through said wire exit radially outwardly for placement on said stator;

moving said winding spindle in rotating and reciprocating movement to direct wire into said slots and around the ends of said teeth whereby said wire is formed into field coils on said stator teeth, wherein said winding spindle is driven by a first servo motor in reciprocating movement and said winding spindle is driven by a second servo motor in rotating movement, and said winding spindle is driven in rotation simultaneously with said reciprocating movement to cause said wire exit to follow said skewed slots along a path extending at a skew angle relative to the longitudinal axis of said stator; and wherein said wire is pushed through said winding spindle at a predetermined rate from a location upstream of said wire exit to cause said wire to be fed onto said stator during movement of said winding spindle.

2. The method of claim 1 wherein said wire is fed into said slots at a first speed, and said wire is fed onto the ends of said teeth at a second speed different from said first speed.

3. The method of claim 1 wherein said wire is fed to predetermined radial locations on said stator controlled by the rate at which said wire is fed through said wire exit during movement of said winding spindle.

4. The method of claim 3 wherein said wire is fed in layers onto said stator wherein said wire is laid at successively different radial positions.

5. The method of claim 4 wherein said successively different radial positions are located successively radially inwardly.

6. The method of claim 1 wherein said wire is pushed through said winding spindle by a feed mechanism mounted for reciprocating movement with said winding spindle whereby said wire is driven at a controlled rate relative to said winding spindle.

7. The method of claim 1 including the step of providing a forming tool extending radially from said winding spindle said forming tool pushing radially outwardly on said wire wound on said teeth at predetermined intervals after predetermined numbers of winds of wire have been wrapped on said teeth.

8. A method of forming field coils on a stator for a dynamo-electric machine, said stator including a plurality of slots defining stator teeth, said method comprising:

positioning said stator in a stator winding machine, said stator winding machine including a winding spindle having a wire exit aperture;

feeding wire through said exit radially outwardly for placement on said stator wherein said wire is pushed through said winding spindle from a location upstream of said wire exit;

moving said winding spindle in rotating and reciprocating movement to direct wire into slots and around ends of said teeth whereby said wire is formed into field coils on said stator teeth, wherein said winding spindle is driven by a first servo motor in reciprocating movement and said winding spindle is driven by a second servo motor in rotating movement, and said winding spindle is driven in rotation simultaneously with said reciprocating movement to cause said wire exit to follow skewed slots in said stator along a path extending at a skew angle relative to the longitudinal axis of said stator; and wherein said wire is fed into said slots of said stator at a first predetermined speed, and said wire is fed onto the ends of said teeth at a second predetermined speed different from said first speed.

9. The method of claim 8 wherein said wire is fed to predetermined radial locations on said stator controlled by the rate at which said wire is fed through said wire exit during movement of said winding spindle.

10. The method of claim 9 wherein said wire is positioned in layers onto said stator wherein said wire is laid at successively different radial positions.

11. The method of claim 10 wherein said successively different radial positions are located successively radially inwardly.

12. The method of claim 8 wherein said wire is pushed through said winding spindle by a feed mechanism mounted for reciprocating movement with said winding spindle whereby said wire is driven at a controlled rate relative to said winding spindle.

* * * * *